(12) United States Patent
Shastry et al.

(10) Patent No.: US 8,905,595 B2
(45) Date of Patent: Dec. 9, 2014

(54) LED STREET LIGHT LENS

(75) Inventors: Chakrakodi Vishnu Shastry, Princeton, NJ (US); Anthony Verdes, Brick, NJ (US)

(73) Assignee: Dialight Corporation, Farmingdale, NJ (US)

( * ) Notice: Subject to any disclaimer, the term of this patent is extended or adjusted under 35 U.S.C. 154(b) by 565 days.

(21) Appl. No.: 12/788,921

(22) Filed: May 27, 2010

(65) Prior Publication Data

US 2010/0302783 A1    Dec. 2, 2010

Related U.S. Application Data

(60) Provisional application No. 61/181,976, filed on May 28, 2009.

(51) Int. Cl.
| | |
|---|---|
| *F21V 5/08* | (2006.01) |
| *F21V 13/04* | (2006.01) |
| *F21V 5/00* | (2006.01) |
| *F21V 5/04* | (2006.01) |
| *G02B 19/00* | (2006.01) |
| *F21W 131/103* | (2006.01) |
| *F21Y 101/02* | (2006.01) |

(52) U.S. Cl.
CPC .......... *F21V 13/04* (2013.01); *F21W 2131/103* (2013.01); *F21V 5/007* (2013.01); *Y02B 20/72* (2013.01); *F21V 5/04* (2013.01); *F21Y 2101/02* (2013.01); *G02B 19/0028* (2013.01); *G02B 19/0061* (2013.01)
USPC ............ 362/311.02; 362/311.04; 362/311.08; 362/311.12; 362/153.1

(58) Field of Classification Search
USPC .............. 362/311.02, 153.1, 311.04, 311.06, 362/311.12, 23.03, 23.05
See application file for complete search history.

(56) References Cited

U.S. PATENT DOCUMENTS

| | | | | |
|---|---|---|---|---|
| 5,463,502 | A * | 10/1995 | Savage, Jr. ................... | 359/819 |
| 7,029,150 | B2 | 4/2006 | Finch | |
| 7,841,750 | B2 * | 11/2010 | Wilcox et al. ................. | 362/334 |
| 8,215,814 | B2 * | 7/2012 | Marcoux ....................... | 362/555 |
| 2005/0162854 | A1 | 7/2005 | Finch | |
| 2007/0002572 | A1* | 1/2007 | Ewig et al. .................... | 362/470 |
| 2008/0279541 | A1 | 11/2008 | Montgomery | |
| 2009/0002985 | A1 | 1/2009 | Peck et al. | |

OTHER PUBLICATIONS

The International Search Report and the Written Opinion of the International Searching Authority, or the Declaration, in PCT/US2010/036417; Dialight Corporation, Applicant; mailed May 27, 2010; 8 pages.

\* cited by examiner

*Primary Examiner* — Sharon Payne

(57) ABSTRACT

The present invention is directed to a lens. In one embodiment, the lens includes a first surface, a second surface that bends a light emitted from a light source with the first surface, a third surface that bends the light emitted from the light source with the first surface and a fourth surface coupled to the second surface and the third surface that bends the light emitted from the light source with the first surface. The first surface and the second surface are dioptric. The first surface and the third surface are dioptric. The first surface and the fourth surface are catadioptric.

10 Claims, 9 Drawing Sheets

LED STREET LIGHT LENS

CROSS REFERENCE TO RELATED APPLICATIONS

This application claims priority under 35 U.S.S. §119(e) to U.S. provisional patent application Ser. No. 61/181,976, filed on May 28, 2009, which is hereby incorporated by reference in its entirety.

BACKGROUND

A light source generally emits light in every direction. For example, the light is emitted 360 degrees around in a hemispherical pattern. Said another way, the light source generally emits light in all directions.

However, certain applications require that light from the light source be directed in a certain direction or in a certain pattern. For example, light that is emitted in an uncontrolled manner wastes much of the light. For example, much of the light would not be used to illuminate a target area or illuminate the target area evenly if the target area is in a particular shape. Therefore, using a light source without any devices to control the direction of the light is undesirable.

SUMMARY

In one embodiment, the present disclosure provides a lens. In one embodiment, the lens includes a first surface, a second surface that bends a light emitted from a light source with the first surface, a third surface that bends the light emitted from the light source with the first surface and a fourth surface coupled to the second surface and the third surface that bends the light emitted from the light source with the first surface. The first surface and the second surface are dioptric. The first surface and the third surface are dioptric. The first surface and the fourth surface are catadioptric.

In one embodiment, the present disclosure provides a light emitting diode street light lens assembly. In one embodiment, the LED street light lens assembly includes an LED, a lens coupled to the LED that changes a circular light output from the LED into a substantially rectangular light output and a reflector coupled to the lens to form an asymmetrical substantially rectangular light output from the substantially rectangular light output.

In one embodiment, the present disclosure provides a method for forming an asymmetrical substantially rectangular light output. In one embodiment, the method includes receiving a light emitted from a light source, wherein a first portion of the light is refracted twice by a first surface and a second surface of a lens, a second portion of the light is refracted twice by the first surface and a third surface of the lens and a third portion of the light is refracted twice and totally internally reflected by the first surface and a fourth surface of the lens, outputting the light source in a substantially rectangular pattern and reflecting a portion of the light source in the substantially rectangular pattern to form the asymmetrical substantially rectangular light output

BRIEF DESCRIPTION OF THE DRAWINGS

So that the manner in which the above recited features of the present invention can be understood in detail, a more particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Light emitting diodes (LEDs) are directional and small light sources, and hence optics can be designed to efficiently manage light distribution over a desired area. In one embodiment, the lens in this application takes a circular light output from an LED and makes it substantially rectangular. In yet another embodiment, the lens in the present application takes a circular light output from an LED and makes it asymmetrically substantially rectangular. The lens can be used for applications such as general area lighting, corridor lighting, parking lot and garage lighting and street lighting.

In one example application, the lens may be used for LED street lighting. Streets are generally rectangular. Hence, to efficiently illuminate and make use of overlap from adjacent lights a rectangular/oval light pattern is desired. Also the light has to be directed across and sideways on the street side with minimal back spill towards the house side. Thus, one aspect of the present disclosure is to spread light evenly for uniform illuminance of a target area having a particular shape.

Figure 1:
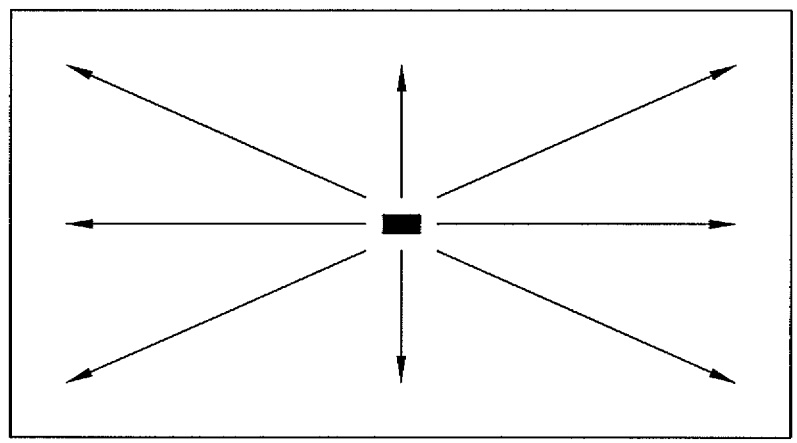
FIG. 1 depicts a Type I beam pattern distribution.

In one embodiment, the lens by itself will provide a substantially rectangular-oval pattern as shown in FIG. 1. This kind of light output is similar to Illuminating Engineering Society of North America (IESNA) type I light pattern which can be used for general area lighting.

Figure 2:
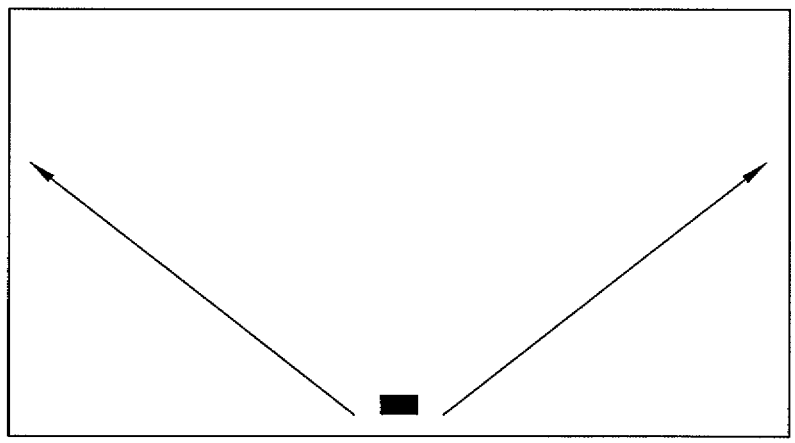
FIG. 2 depicts a Type II, III and IV light distribution pattern.

For applications such as street light, a type II, type III or type IV beam pattern distribution, where a light distribution to one side of the light source is desired. FIG. 2 illustrates an example of a type II, type III or type IV beam pattern distribution. In one embodiment, even type V beam patterns (e.g., oval or circular beam patterns) can be achieved.

Combining the above lens at different orientations with a reflective surface or a reflector, asymmetrical type II, type III and type IV beam patterns can be achieved. The reflector pushes most of the light emitted from a light source to the street side. This prevents most of the light from back spilling towards the house side. The reflective surface or reflector could be a part of the lens itself and reflect light either by reflection or "total internal reflection" (TIR). In one embodiment, the reflective surface could be an external reflector placed at the desired distance from the lens. In another embodiment, the reflective surface may be part of the lens (e.g. a single piece forming the lens and the reflective surface).

Figure 3:
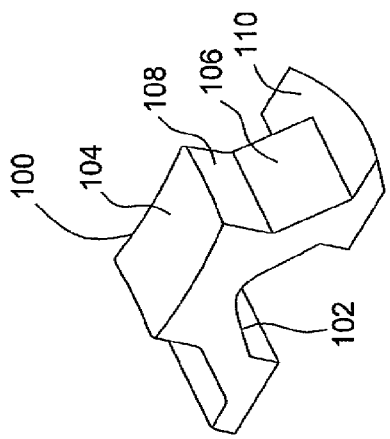
FIG. 3 depicts an isometric view of one embodiment of a lens of the present disclosure.

FIG. 3 illustrates one embodiment of a lens 100. In one embodiment, the lens 100 may be made from any optical grade material such as optical grade plastic or glass. In one embodiment, the lens 100 comprises polycarbonate. The lens 100 may be extruded or molded. The lens 100 may be extruded to any desired length or width. In one embodiment, a cross section of the lens 100 is translated linearly to give a rectangular profile lens. However, it should be noted that the lens 100 may have any profile shape depending on a particular application of the lens 100.

In one embodiment, the lens 100 includes a first surface 102, a second surface 104, a third surface 106 and a fourth surface 108. The lens 100 also includes a matching third surface 106. In other words, the lens 100 may have two third surfaces 106. The lens 100 may include a fourth surface 108 on all four sides of the lens 100. In other words, the fourth surfaces 108 may form any shape (e.g., a rectangle, a square, a circle) of a top portion of the lens 100.

The third surface 106 is coupled to the first surface 102 and the fourth surface 108. The fourth surface 108 is coupled to the third surface 106 and the second surface 104. In one embodiment, the second surface 104 and the fourth surface 108 are coupled at approximately a 90 degree angle. In one embodiment, the third surface 106 and the fourth surface 108 are coupled at an angle greater than 90 degrees.

In one embodiment, the first surface 102 comprises a curved surface. For example, the first surface 102 may be a toroid or have a toroidal shape or be a conic cylindrical surface. In one embodiment, the second surface 104 also comprises a curved surface. For example, the second surface 104 may be a conic or have a conical shape or a conic rectangular surface.

In one embodiment, the third surface 106 and the fourth surface 108 may be substantially flat or planar. In another embodiment, the third surface 106 and the fourth surface 108 may have some curvature. In addition, the third surface 106 and the fourth surface 108 may be angled. For example, the third surface 106 may be a prism shape.

The combination of surfaces 102, 104, 106 and 108 and their respective surface shapes in the lens 100 work together to bend light into a desired beam pattern. In one embodiment, the first surface 102 and the second surface 104 are dioptric. That is, the first surface 102 and the second surface 104 work together to use two refractions to bend light emitted from a light source. For example, the first surface 102 refracts the light once and the second surface 104 refracts the light a second time. In one embodiment, the first surface 102 and the third surface 106 are also dioptric.

In one embodiment, the first surface 102 and the fourth surface 108 are catadioptric. That is, the first surface 102 and the fourth surface 108 work together to use two refractions and one total internal reflection (TIR) to bend the light emitted from the light source. For example, the first surface 102 refracts the light and the fourth surface 108 refracts and totally internally reflects the light from the light source.

The lens 100 is also designed such that the various combinations of the surfaces 102, 104, 106 and 108 bend different portions of the light emitted from the light source. For example, the light can be divided into three angular segments: a low angle light, a medium angle light and a high angle light.

Figure 8:
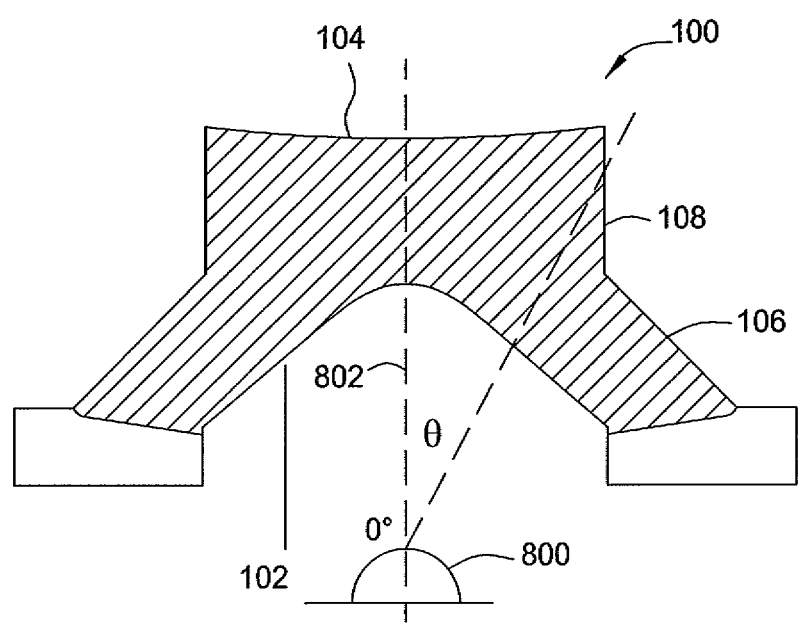
FIG. 8 depicts one embodiment of a cross sectional view of the lens.
Figure 9:
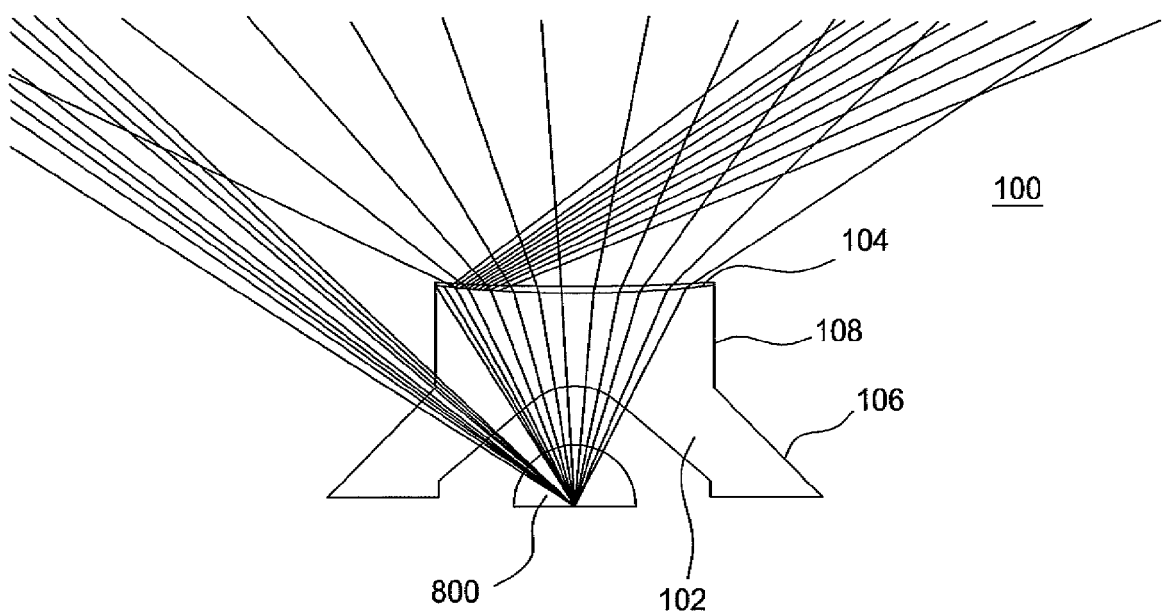
FIG. 9 depicts one embodiment of a view of how light emitted from an light emitting diode (LED) is reflected by the lens.

FIGS. 8 and 9 are provided to help illustrate in more detail how the surfaces 102, 104, 106 and 108 work together and help to illustrate how to measure the angles of the light. Referring to FIG. 8, a light source 800 has a central light emitting axis 802. Light emitted from the light source 800 on the central light emitting axis 802 has an angle θ of 0 degrees. It should be noted that light is also emitted into and out of the page.

As discussed below, a reflector may be used with the lens 100. When the reflector is used, the light emitted into the page is reflected back out of the page, thus minimizing the back spill of light. As a result, type II, type III and type IV light distribution patterns may also be achieved. This is discussed in further detail below.

In one embodiment, the first surface 102 and the second surface 104 are designed to bend light emitted at a low angle, e.g., between 0 degrees to approximately 32 degrees relative to the central light emitting axis 802. The first surface 102 and the second surface 104 work together in spreading the low angle light evenly, thus, preventing a hot spot directly below the light source 800.

The first surface 102 and the third surface 106 are designed to bend light emitted at a high angle, e.g., between approximately 48 degrees to 90 degrees relative to the central light emitting axis 802. The first surface 102 and the third surface 106 work together in putting the light at extreme ends of a target surface, e.g., a street or a road.

The first surface 102 and the fourth surface 108 are designed to bend light emitted at a medium angle, e.g., between approximately 32 degrees to 48 degrees. The first surface 102 refracts the light onto the fourth surface 108. The fourth surface 108 totally internally reflects (TIRs) the light to push the light at high angles towards the extreme ends of the target surface.

FIG. 9 illustrates one example of how the surfaces 102, 104, 106 and 108 work together to re-direct light at higher angles, thus, achieving the type I beam patterns. Compared to collimating lenses that collect light using refraction and TIR to narrow angles, the lens 100 of the present disclosure collects light and spreads the light to higher angles using refraction and TIR. This helps the lens 100 redirect the light towards extreme ends of a target surface.

One working example of the above described lens 100 that achieves a type I beam pattern comprises a rectangular lens. The first surface 102 is an X toroid with a conic constant of −2.0591 and a radius of curvature of 0.79847. The second surface 104 is a conic with a conic constant of −49.473 and radius of curvature of 5.2242. The light source, e.g., an LED, is located 2.4967 millimeters (mm) from the center of the first surface 102 along an optical axis. The angle between the third surface 106 and the fourth surface 108 is 135.843 degrees. The lens material is polycarbonate.

The above parameters provide only one working example and are not intended to be limiting. It should be noted that the material of the lens 100, the size or dimensions of the lens 100, the curvature of the surfaces, 102, 104, 106 and 108, the angle between the third surface 106 and the fourth surface 108 and the distance between the first surface 102 and the light source 800 may be modified or vary depending on the specific application or requirements of the specific application.

For example, in one embodiment depending on the application or the size of a housing the lens will be placed in the size or dimensions of the lens may be first set. Subsequently, the curvatures or angles of the surfaces 102, 104, 106 and 108 may then be adjusted based upon a fixed distance of the light source 800 from the first surface 102 until a desired beam pattern is achieved.

Figure 4:
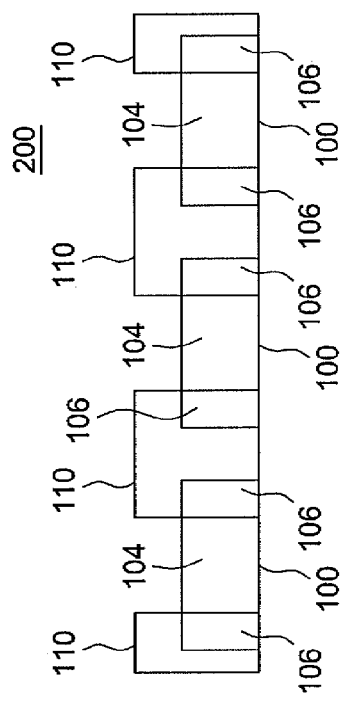
FIG. 4 depicts a top view of one embodiment of the lens.

The lens 100 can be grouped in an array 200. The array 200 may have any number of lenses 100 as desired or needed for a particular application. FIGS. 4-7 illustrate various views of the array 200 of lenses 100. FIG. 4 illustrates a top view of the array 200. The lenses 100 are coupled together via a base 110. The base 110 may be wider than the lenses 100 for added stability when the array 200 is coupled to a printed circuit board or a metal clad board. However, the base 110 may be any width necessary for a particular configuration of an assembly or application.

Figure 5:
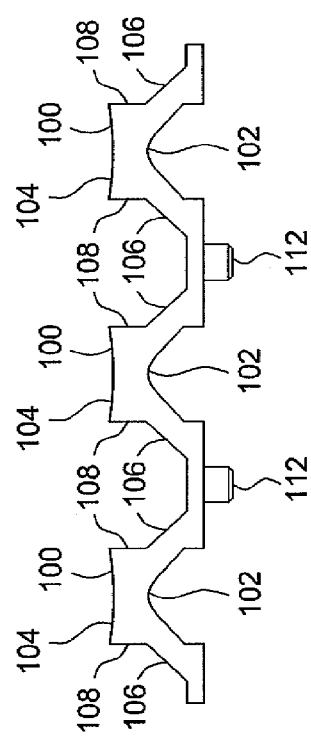
FIG. 5 depicts a side view of one embodiment of the lens.
Figure 6:
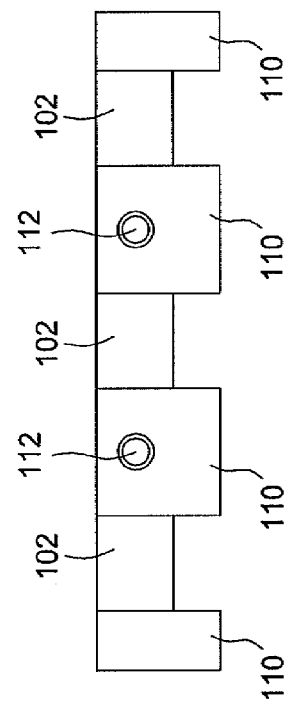
FIG. 6 depicts a bottom view of one embodiment of the lens.
Figure 7:
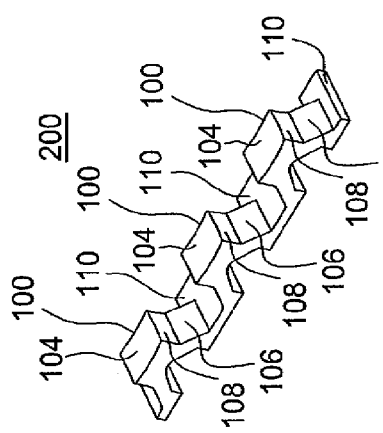
FIG. 7 depicts an isometric view of one embodiment of multiple lens.

FIG. 5 illustrates a side view of the array 200. FIG. 5 illustrates feet 112. The array 200 may include one or more feet 112 for mating with matching holes in a printed circuit board or a metal clad board. Alternatively, the array 200 may not have any feet 112 and may be coupled to a printed circuit board or a metal clad board using an adhesive such as a glue or a double sided adhesive tape. FIG. 6 illustrates a bottom view of the array 200. FIG. 7 illustrates an isometric view of the array 200.

As noted above, the lens 100 may be used in combination with a reflector to create a type II, III or IV beam pattern. Said another way, the lens 100 may be used with a reflector to create an asymmetrical substantially rectangular beam pattern.

Figure 11:
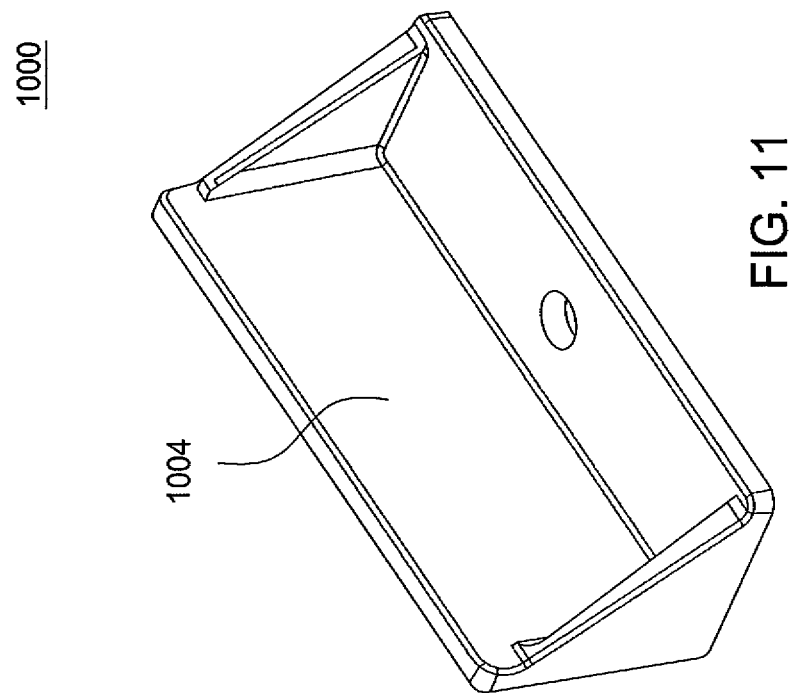
FIG. 11 depicts an isometric back and top view of the first embodiment of a reflector.
Figure 10:
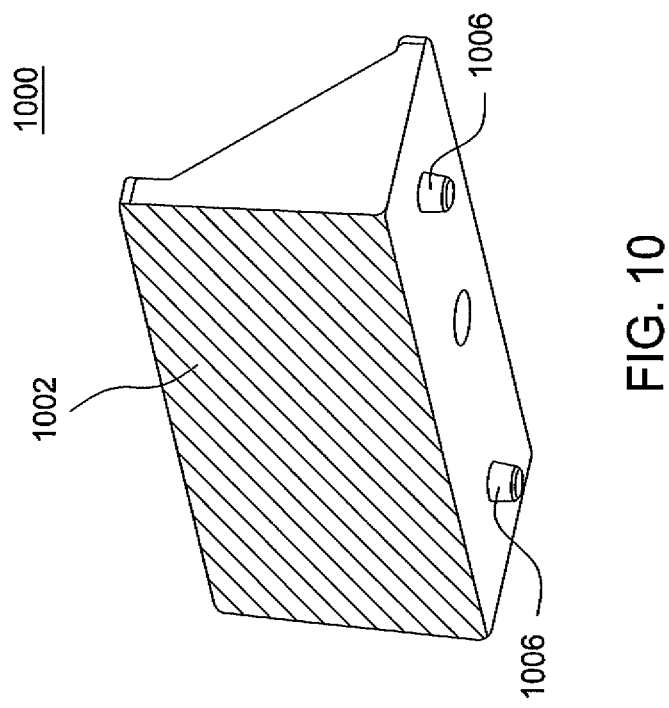
FIG. 10 depicts an isometric front and bottom view of a first embodiment of a reflector.

FIGS. 10 and 11 illustrate one embodiment of a reflector 1000. FIG. 10 illustrates an isometric front and bottom view of the reflector 1000. The reflector 1000 has a reflective side 1002. The reflective side 1002 may comprise any reflective material, e.g., a mirror or metalized plastic. In one embodiment, the reflective side 1002 may have some curvature depending on a desired beam pattern and the design of the lens 100. The reflector 1000 includes one or more feet 1006 for mating with matching holes in a printed circuit board or a metal clad board. Alternatively, the reflector 1000 may not have any feet 1006 and may be coupled to a printed circuit board or a metal clad board using an adhesive such as a glue or a double sided adhesive tape.

FIG. 11 illustrates an isometric back and top view of the reflector 1000. The reflector 1000 has a back side 1004. In one embodiment, the back side 1004 is hollowed out and is flat or angled.

Figure 13:
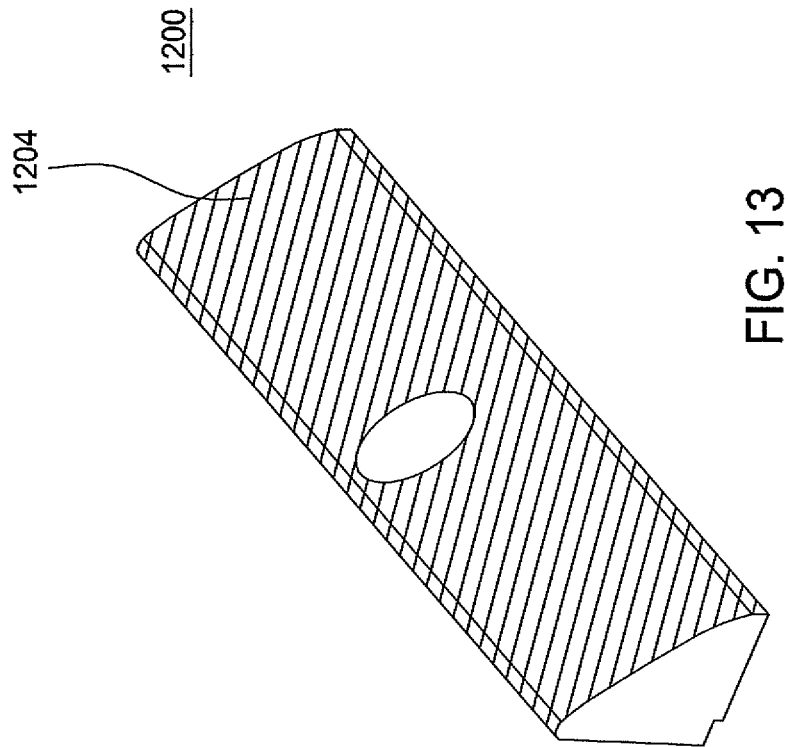
FIG. 13 depicts an isometric back and top view of the second embodiment of the reflector.
Figure 12:
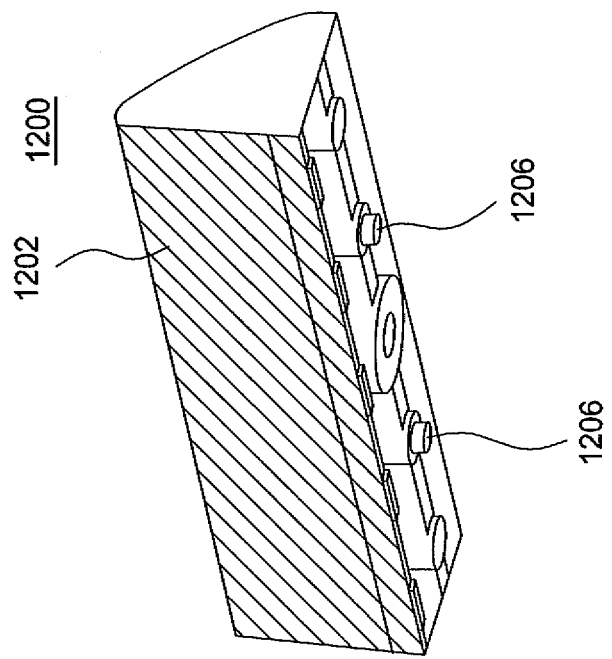
FIG. 12 depicts an isometric front and bottom view of a second embodiment of a reflector.

FIGS. 12 and 13 illustrate another embodiment of a reflector 1200. FIG. 12 illustrates an isometric front and bottom view of the reflector 1200. The reflector 1200 has a reflective side 1202. The reflective side 1202 may comprise any reflective material, e.g., a mirror or metalized plastic. In one embodiment, the reflective side 1202 may have some curvature depending on a desired beam pattern and the design of the lens 100. The reflector 1200 includes one or more feet 1206 for mating with matching holes in a printed circuit board or a metal clad board. Alternatively, the reflector 1200 may not have any feet 1206 and may be coupled to a printed circuit board or a metal clad board using an adhesive such as a glue or a double sided adhesive tape.

FIG. 13 illustrates an isometric back and top view of the reflector 1200. The reflector 1200 has a back side 1204. In one embodiment, the back side 1204 is fabricated to have a curved or rounded side. In one embodiment, the back side 1204 of the reflector may also comprise a reflective material, e.g., a mirror or a metalized plastic.

Figure 14:
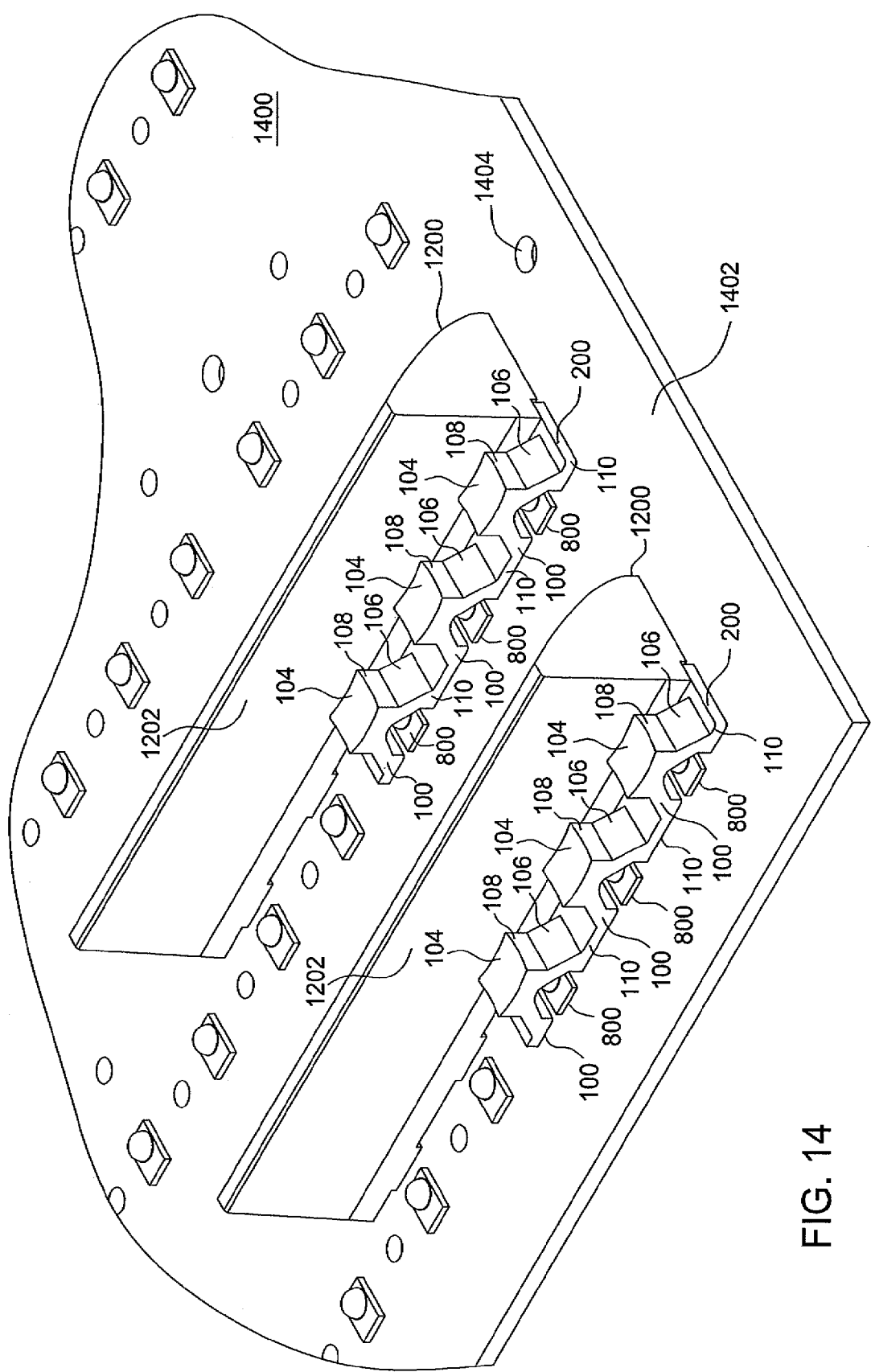
FIG. 14 depicts an isometric view of an assembly.

FIG. 14 illustrates one embodiment of an assembly 1400. The assembly 1400 may be used for various lighting applications, e.g., street lighting, parking garage lighting, corridor lighting, etc. For example, the assembly 1400 may be placed in a housing and mounted on a pole for street lighting.

The assembly 1400 comprises a board 1402, e.g., a printed circuit board or a metal clad board having a plurality of holes 1402. The plurality of holes 1402 may be aligned in rows that correspond to a desired positioning of LEDs 800, the array 200 of lens 100 and the reflectors 1200. The plurality of holes 1402 mate with the feet 112 and 1206 of the lens 100 and reflector 1200, respectively.

The assembly 1400 comprises a matrix of the array 200 of lenses 100 and the reflectors 1200. For example, the assembly 1400 may include multiple arrays 200 of lens 100 that are aligned adjacent to one another to form an even numbered grid, e.g., a 3×3 grid of lenses or an uneven numbered grid, e.g., a 3×10 grid of lenses and so forth.

In one embodiment, using the reflector 1200 having the reflective curved backside 1204 allows the light emitted from LEDs 800 behind the reflector to be controlled. Although, FIG. 14 illustrates the use of the reflector 1200, it should be noted that either reflector 1000 or reflector 1200 can be used in the assembly 1400. It should also be noted that any type of LED 800 may be used with the lens 100 described herein. In addition, although FIG. 14 illustrates the use of the holes 1404, it should be noted that the LEDs 800, the array 200 of lenses 100 and the reflector 1200 may all be coupled to the board 1402 via an adhesive, e.g., a glue or double sided adhesive tape.

Figure 15:
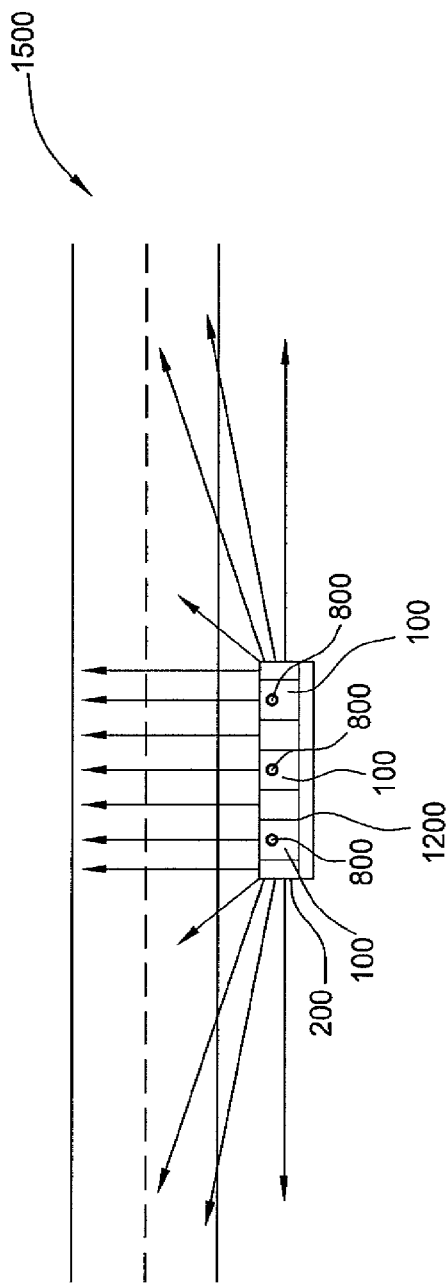
FIG. 15 depicts an illustrative view of the lens in use.

FIG. 15 illustrates an example view of the lens 100 in use. For example, FIG. 15 helps to illustrate how the lens 100 of the present disclosure may be applied for use in street lighting looking down on top of a street 1500. Although only the lens 100, the reflector 1200 and the LED 800 are illustrated in FIG. 15, it should be noted that the lens 100, the reflector 1200 and the LED 800 may actually be applied using the assembly 1400 illustrated in FIG. 14.

In one example, the lens 100 may be used to illuminate the street 1500 that is narrow, e.g., a two lane road that requires lighting at a minimal distance across the road. When applied to a street 1500 that is narrow, the lens 100 having one or more LEDs 800 and the reflector 1200 or the array 200 of lenses 100 may be positioned approximately parallel to the street 1500. However, it should be noted that the positioning and orientations of the lens 100, the LEDs 800 and the reflector 1200 or the array 200 of lenses 100 will depend on the application.

In this embodiment, the reflector 1200 may be positioned along the length of the lens 100 or the array 200 of lenses 100. This allows most of the light to be directed towards the street side. However, in some cases it may be desirable to have some back spill towards the house side if light is needed to illuminate a sidewalk or walkway along the street. Although, FIG. 15 illustrates using the reflector 1200, it should be noted that the reflector 1000 may also be used.

Figure 16:
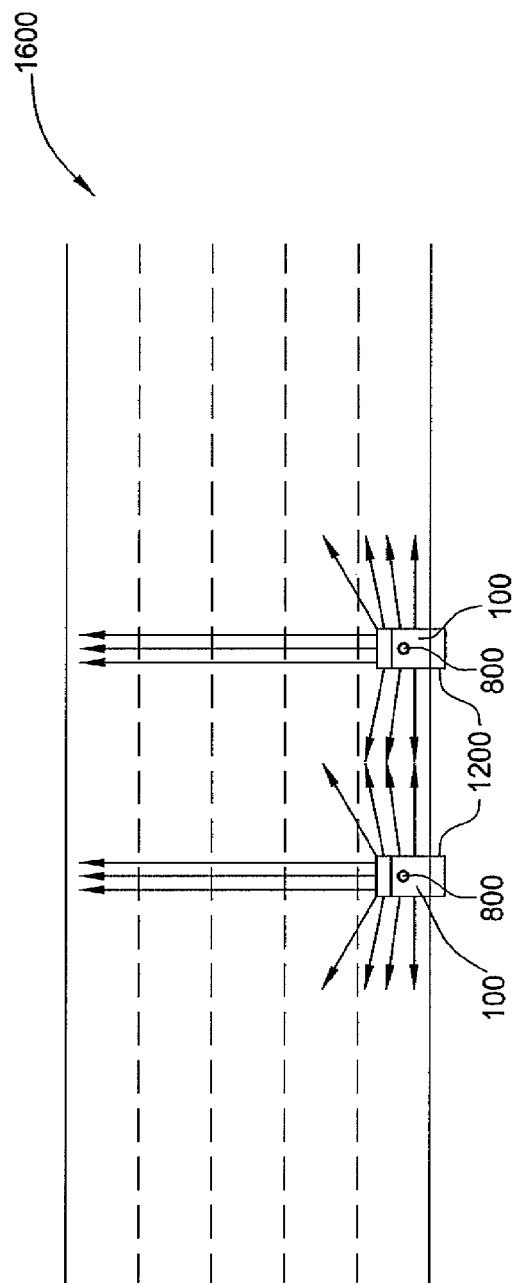
FIG. 16 depicts another illustrative view of the lens in use.

FIG. 16 illustrates another illustrative view of the lens 100 in use. In FIG. 16, the lens 100 may be applied to a highway or a wider road 1600 having multiple lanes, e.g. five or six lanes. When applied to the wider road 1600, the lens 100 having an LED 800 may be turned 90 degrees and positioned approximately perpendicular to the wider road 1600. In this orientation the reflector may be positioned on a width of the lens 100. Again, this allows most of the light to be emitted towards the street side. However, in some cases it may be desirable to have some back spill towards the house side if light is needed to illuminate a sidewalk or walkway along the street.

It should be noted that the orientations of the lens 100 relative to the roads 1500 and 1600 illustrated in FIGS. 15 and 16 are illustrative examples and should not be considered limiting. The lens 100 may be oriented in any position relative to a target surface to illuminate the target surface, e.g. a road, as desired.

Figure 17:
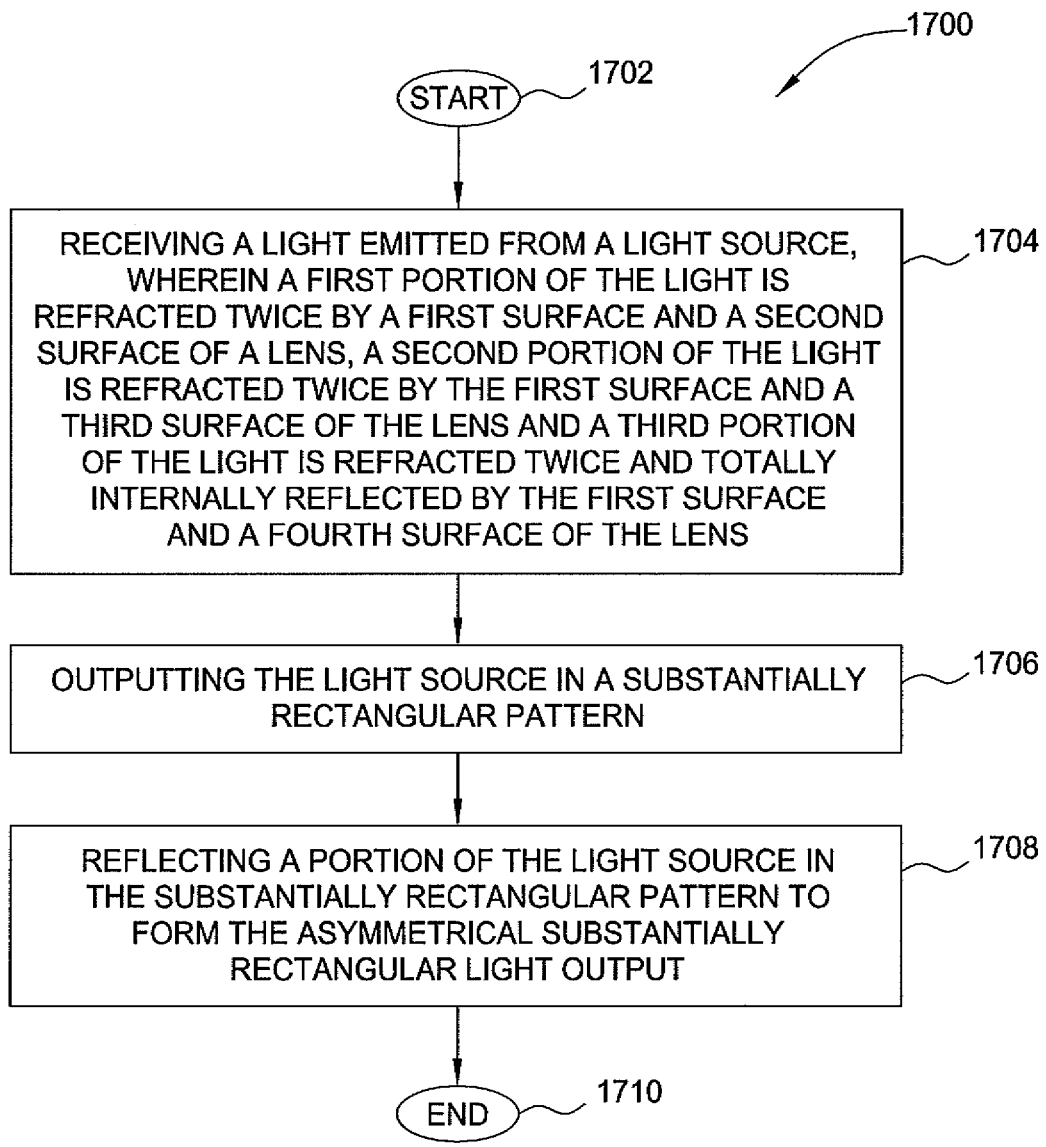
FIG. 17 depicts a flow chart for one embodiment of a method for forming an asymmetrical substantially rectangular light output.

FIG. 17 illustrates a flow chart for one embodiment of a method 1700 for forming an asymmetrical substantially rectangular light output. In one embodiment, the method 1700 may be performed by the lens 100 and the reflector 1000 or the reflector 1200 described herein.

The method 1700 begins at step 1702. At step 1704, the method 1700 receives a light emitted from a light source, wherein a first portion of the light is refracted twice by a first surface and a second surface of a lens, a second portion of the light is refracted twice by the first surface and a third surface of the lens and a third portion of the light is refracted twice and totally internally reflected by the first surface and a fourth surface of the lens.

For example, as noted above with reference to FIG. 8, the first surface 102 and the second surface 104 are designed to bend light emitted at a low angle, e.g., between 0 degrees to approximately 32 degrees relative to the central light emitting axis 802. The first surface 102 and the third surface 106 are designed to bend light emitted at a high angle, e.g., between approximately 48 degrees to 90 degrees relative to the central light emitting axis 802. The first surface 102 and the fourth surface 108 are designed to bend light emitted at a medium angle, e.g., between approximately 32 degrees to 48 degrees.

At step 1706, the method 1700 outputs the light source in a substantially rectangular pattern. As discussed above, the lens 100 may be used to bend light in a type I beam pattern illustrated in FIG. 1.

At step 1708, the method 1700 reflects a portion of the light source in the substantially rectangular pattern to form the asymmetrical substantially rectangular light output. As noted above, a reflector 1000 or 1200 may be used with the lens 100 to form an asymmetrical type II, III or IV beam patterns. The reflector 1000 or 1200 reflects light to minimize the amount of backspill of light towards the house side.

As a result, the asymmetrical substantially rectangular light output may be achieved. This beam pattern has useful application in various lighting applications, such as for example, street lighting, parking garage lighting, corridor lighting. The method 1700 ends at step 1710.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A lens, comprising:
    a first surface;
    a second surface that bends a light emitted from a light source with the first surface;
    a third surface and a matching third surface opposite the third surface that each bends the light emitted from the light source with the first surface, wherein the third surface and the matching third surface are each substantially flat; and
    a plurality of fourth surfaces on all four sides of a top portion of the lens to form a rectangle, wherein at least two of the plurality of fourth surfaces are each coupled to the second surface and the third surface that bends the light emitted from the light source with the first surface, wherein each one of the plurality of fourth surfaces is substantially flat, wherein the third surface and the matching third surface are coupled to a respective one of the at least two of the plurality of fourth surfaces at greater than 90 degrees,
    wherein the first surface and the second surface are dioptric, the first surface, the third surface and the matching third surface are dioptric and the first surface and each one of the at least two of the plurality of fourth surfaces are catadioptric.

2. The lens of claim 1, wherein the first surface comprises a toroid.

3. The lens of claim 1, wherein the second surface is a conic.

4. The lens of claim 1, wherein the first surface and the second surface bend a portion of the light emitted at a low angle.

5. The lens of claim 1, wherein the first surface and the third surface bend a portion of the light emitted at a high angle.

6. The lens of claim 1, wherein the first surface and the fourth surface bend a portion of the light emitted at a medium angle.

7. The lens of claim 1, wherein the second surface is coupled to each one of the at least two fourth surfaces at approximately 90 degrees.

8. The lens of claim 1, wherein the lens comprises polycarbonate.

9. The lens of claim 1, wherein the light source is a light emitting diode (LED).

10. A method for forming an asymmetrical substantially rectangular light output, comprising:
    receiving a light emitted from a light source, wherein a first portion of the light is refracted twice by a first surface and a second surface of a lens, a second portion of the light is refracted twice by the first surface and a third surface of the lens and a third portion of the light is refracted twice and totally internally reflected by the first surface and a fourth surface of a plurality of fourth surfaces of the lens, wherein the third surface is substantially flat, wherein the fourth surface is substantially flat, wherein the third surface is coupled to the fourth surface at greater than 90 degrees, wherein the lens comprises a matching third surface opposite the third surface, wherein the plurality of fourth surfaces on all four sides of a top portion of the lens form a rectangle;
    outputting the light emitted from the light source in a substantially rectangular pattern; and
    reflecting, via a backside of a reflector, a fourth portion of the light emitted from the light source in the substantially rectangular pattern to form the asymmetrical substantially rectangular light output.

* * * * *